(12) United States Patent
Chow

(10) Patent No.: US 10,110,162 B2
(45) Date of Patent: Oct. 23, 2018

(54) AUTOMATIC PHOTOVOLTAIC SOLAR PANEL WASHER

(71) Applicant: Reuben H. Chow, Oakland, CA (US)

(72) Inventor: Reuben H. Chow, Oakland, CA (US)

(73) Assignee: Reuben Chow, Oakland, CA (US)

( * ) Notice: Subject to any disclaimer, the term of this patent is extended or adjusted under 35 U.S.C. 154(b) by 117 days.

(21) Appl. No.: 15/072,540

(22) Filed: Mar. 17, 2016

(65) Prior Publication Data

US 2017/0272030 A1  Sep. 21, 2017

Related U.S. Application Data

(63) Continuation-in-part of application No. 13/914,591, filed on Jun. 10, 2013, now abandoned.

(60) Provisional application No. 61/690,249, filed on Jun. 22, 2012.

(51) Int. Cl.

| | |
|---|---|
| *B08B 1/00* | (2006.01) |
| *H02S 40/12* | (2014.01) |
| *B05B 1/20* | (2006.01) |
| *B08B 3/02* | (2006.01) |
| *B08B 5/02* | (2006.01) |
| *F26B 21/00* | (2006.01) |
| *H02S 40/10* | (2014.01) |
| *F24S 40/20* | (2018.01) |

(52) U.S. Cl.
CPC ............ *H02S 40/12* (2014.12); *B05B 1/20* (2013.01); *B08B 1/008* (2013.01); *B08B 3/024* (2013.01); *B08B 5/02* (2013.01); *F24S 40/20* (2018.05); *F26B 21/004* (2013.01); *H02S 40/10* (2014.12)

(58) Field of Classification Search
None
See application file for complete search history.

(56) References Cited

U.S. PATENT DOCUMENTS

2014/0150818 A1* 6/2014 Chow .................. B08B 1/00
134/6

* cited by examiner

*Primary Examiner* — Michael E Barr
*Assistant Examiner* — Jason P Riggleman
(74) *Attorney, Agent, or Firm* — CE Scalar Tech Corp; I. Reuben Chow

(57) ABSTRACT

An Automatic (Auto) Photovoltaic (PV) Solar Panel Washer comprising a main carrier joined by a connecting member to the main mast. A main hydraulic cylinder system comprising one or more hydraulic cylinders and connector arrangement on the main mast raises the main mast up or pushes it down, activating the connecting member, thereby raising or lowering the main carrier. The positioning hydraulic cylinder determines the angle of the main carrier by pushing one end down or bringing it up. A rotating device assembly rotates the main mast and main carrier clockwise or counterclockwise from rest position over its stationary post. The main carrier comprises a rigid frame with attachments including a cleaning assembly consisting of air cylinders with cleaning wiper systems, tracks for the air cylinder shafts, wash material pipes with spray devices attached, rinse material pipes with spray devices attached, and compressed air drying pipes with air spray devices.

21 Claims, 9 Drawing Sheets

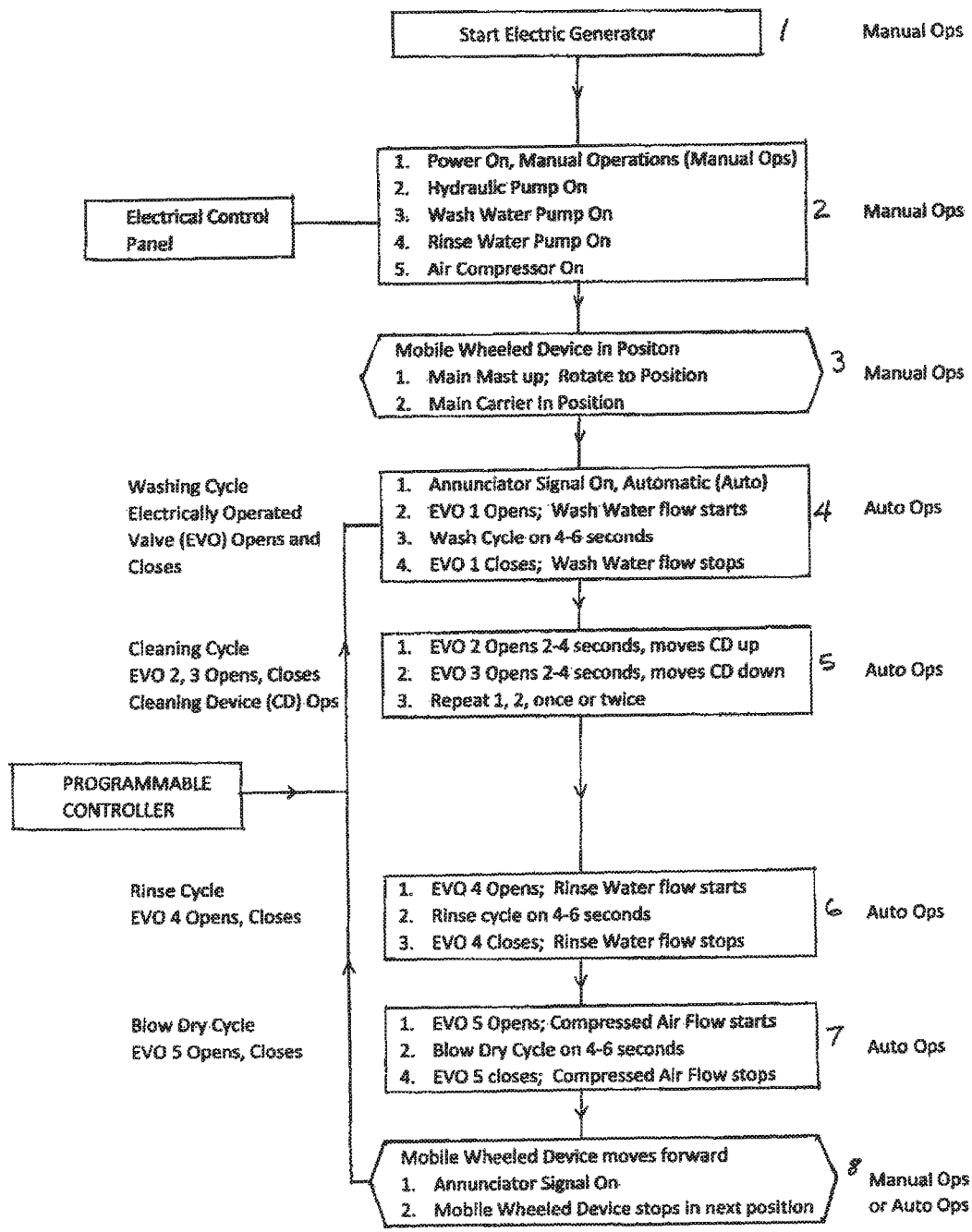
Figure 5: Operations Sequence, Washing, Cleaning, Rinsing and Blow Drying PV Panels

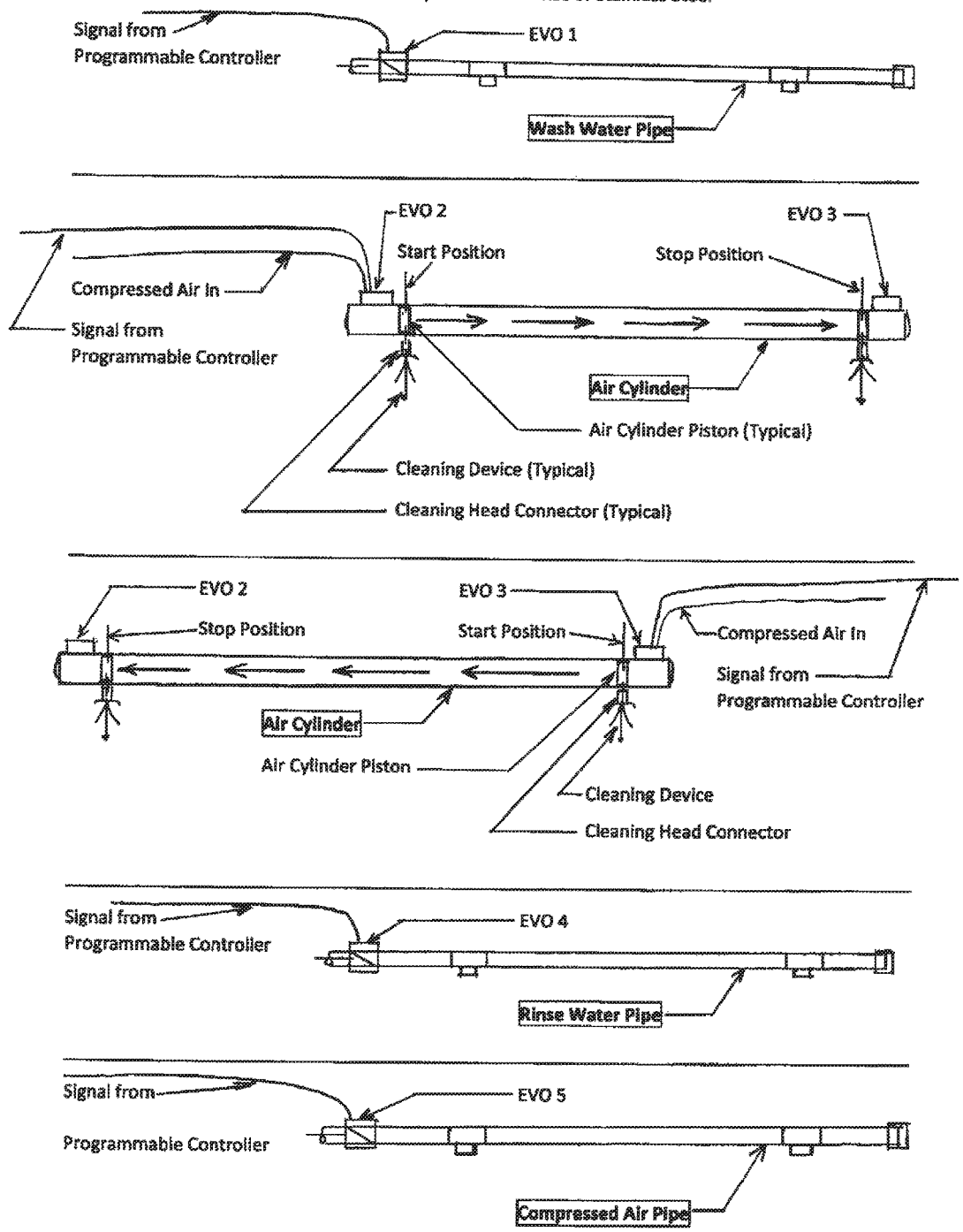
Figure 6: Pipe Details, Wash Water Pipes; Rinse Water Pipes; Compressed Air Pipes

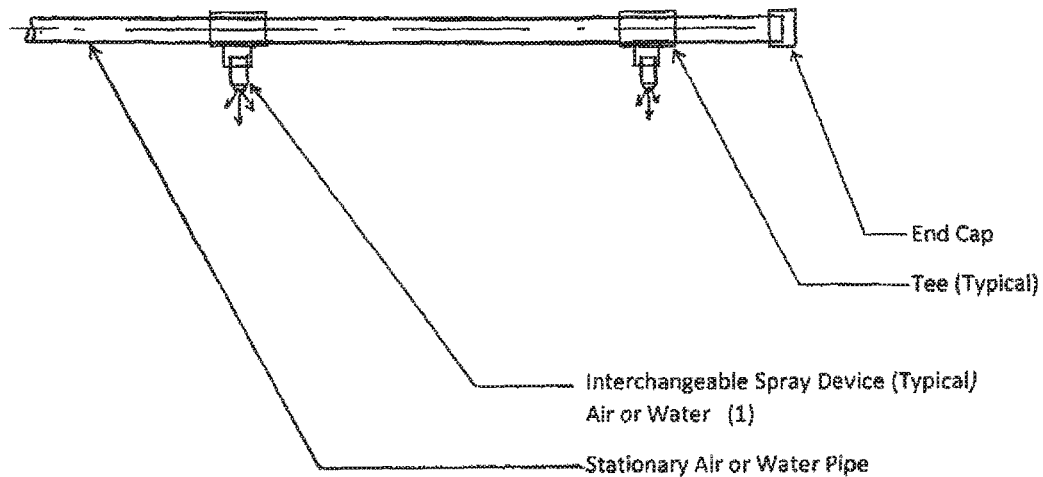
Figure 7: Wash Water Pipes; Rinse Water Pipes; Compressed Air Pipes

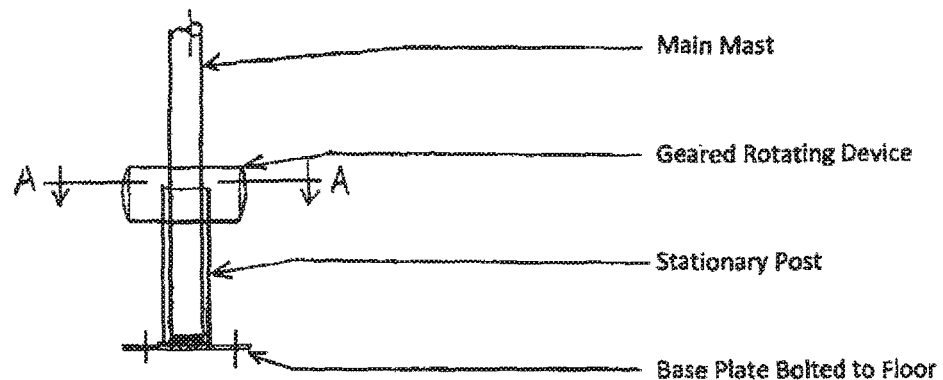
Figure 8A: Main Mast, Stationary Post and Geared Rotating Device
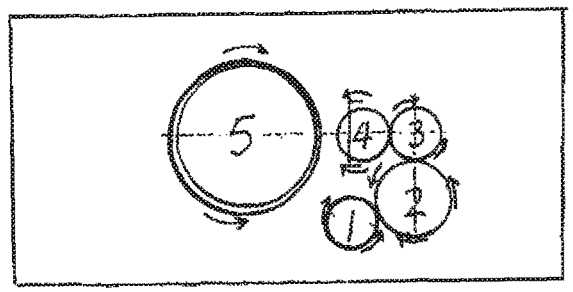
1. Drive Shaft and Gear
2. Idler Gear
3. Transfer Idler Gear
4. Connecting Gear and Clutch
5. Main Mast and Gear
Figure 8B: View A-A, Partial Gear Arrangement in Geared Rotating Device

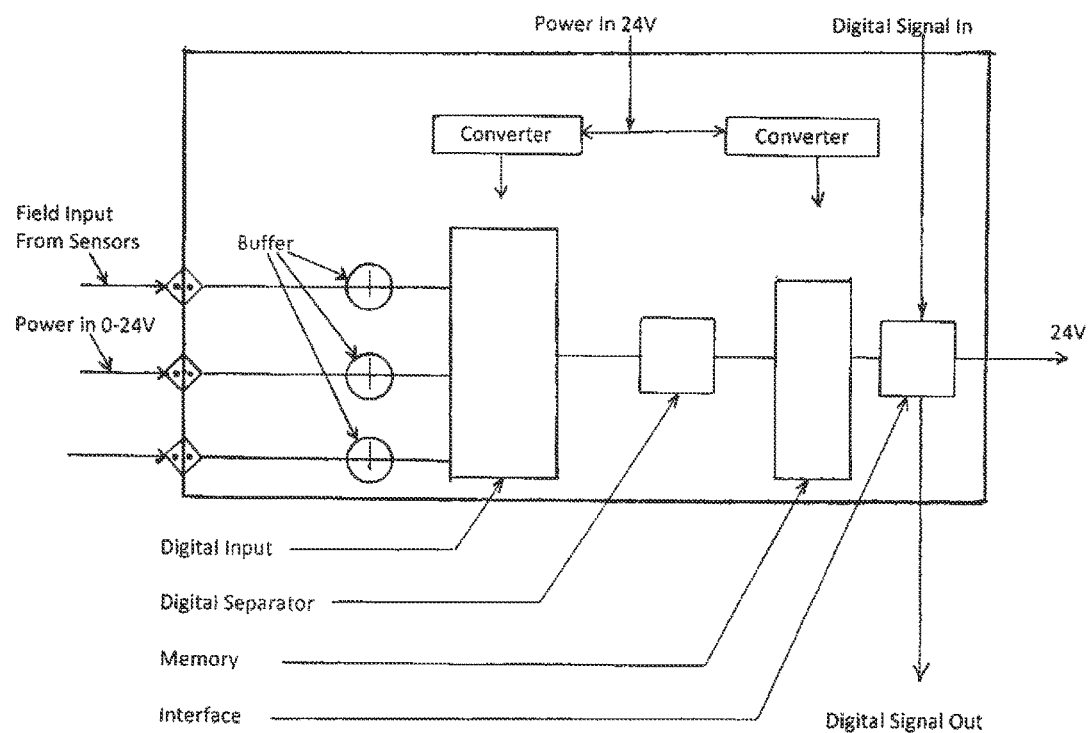
Figure 9 :   Programmable Controller

AUTOMATIC PHOTOVOLTAIC SOLAR PANEL WASHER

CROSS-REFERENCE TO RELATED APPLICATION

The present application is a continuation-in-part (CIP) of Non-Provisional U.S. patent application Ser. No. 13/914,591 filed on Jun. 10, 2013 and Provisional U.S. Patent Application Ser. No. 61/690,249 filed on Jun. 21, 2012. The present application claims the benefit of the filing date of the provisional patent application 61/690,249 and U.S. patent application Ser. No. 13/914,591. The contents of non-provisional patent application and provisional patent application are incorporated herein by reference.

FIELD OF INVENTION

The present invention relates to an automatic photovoltaic (PV) solar panel washer. More particularly, the present invention relates to an automatic PV solar panel washer device and a method of automatic washing, cleaning and protection of PV solar panels (panels).

BACKGROUND OF THE INVENTION

Photovoltaic ("PV") modules, also known as solar panel modules, typically include one or more photovoltaic panels and the associated electrical wiring for connecting the module to a desired circuit. PV modules in solar "farms" are typically ground-mounted on a rack system in long rows, facing the sun at a pitched angle in order to place them in the best position for receiving the necessary sunlight to generate electricity. However, dust, dirt, debris, snow and other materials collect on the panels over time and reduce the panel efficiency and capacity to produce electrical power. Dirt and dust and other material build-up on the panels prevent sunlight from reaching the critical elements in the panel material, reducing electrical output by five to fifteen percent or more. With frequent cleaning, up to at least four times a year, depending on their location and environment the solar panels perform as optimally designed.

It would therefore be advantageous to provide a means for cleaning the solar panel in order to maximize their full potential in providing a cost effective and sustainable source of electricity. The auto PV solar panel washer of the present invention is to perform automatic washing, cleaning and protection of PV solar panels (panels). Washing, rinsing, protecting and drying functions would be performed by the auto PV solar panel washer on the panels by the equipment systems placed on a mobile wheeled device as it moves through or along a plurality of rows or arrays of panels.

The auto PV solar panel washer allows for a more efficient, cost effective and safe washing of panels, than when compared to manual washing. The auto PV solar panel washer in performing the washing, cleaning and protection of the solar panels would enable the panels to restore losses in capacity and hence to restore their maximum electrical power generating capability.

U.S. Pat. No. 8,430,724 discloses surface cleaning system and method of efficiently removing stain, including high adhesive substance, from a surface, especially a surface of an automobile. The cleaning operation can be completed by either hand operation or machine operation. The user is able to select the compressible body being coupled with a hand held actuator for hand operation or a machine buffering device for machine operation.

JP S6076175 discloses automatically washing the panels with wipers usually held to stand vertically to the ground while in washing. The wipers are laid to be contacted closely with the panel face, so that the panel face is washed by the wipers driven by drive means with water flowing over the panel face.

JP2012124303 discloses solar panel cleaning device comprising a groove installed at both side parts of a solar panel maintenance frame. One end and the other end of the groove are respectively closed. A roll brush or channel brush washes the surface of a solar panel. Both end parts of a roll brush or a channel brush are supported by the groove.

SUMMARY OF THE INVENTION

It is an object of the present invention to provide an automated means of washing, cleaning and protecting PV solar panels which allows fast, safe and effective cleaning, and result in restoration and maintenance of their maximum electrical power production capacity. Ground-mounted Solar panel installations may range from a few rows of panels (1000+ panels) to over 500,000+ panels. An automated means would provide consistent, safe and efficient washing, cleaning and protection of panels.

One aspect of the present invention relates to an automatic (auto) photovoltaic (PV) solar panel washer comprising:

a main carrier joined by a connecting member to a J-shaped main mast;

a main hydraulic cylinder system comprising one or more hydraulic cylinders and connector arrangement on the main mast controls the raising and lowering of the main carrier and a positioning hydraulic cylinder controls the angle of the main carrier;

a rotating device assembly rotates the main mast and main carrier about the stationary post, from rest position to working position, clockwise or counterclockwise.

said main carrier comprising a rigid frame with attachments including a cleaning assembly comprising air cylinders with attached cleaning wipers, tracks for the air cylinder moving pistons or shafts, wash material pipes with spray devices, rinse material pipes with spray devices and compressed air drying pipes with air spray devices.

One aspect of the present invention relates to the main carrier comprising two (2) air cylinders oriented to move cleaning wiper assemblies attached to the ends of the pistons or shafts back and forth along the faces or active surfaces of the PV solar panels thereby cleaning the panels of dirt, dust, debris, snow or other material.

One aspect of the present invention relates to the auto PV solar panel washer wherein the wash and rinse material pipes, spray devices and the compressed air pipes and air spray devices provide washing, rinsing and blow drying of the solar panel surfaces during and after the cleaning cycles.

Another aspect of the present invention relates to the auto PV solar panel washer wherein for some materials including snow, only the compressed air pipes would be activated for blow drying after cleaning.

Another aspect of the present invention relates to the auto PV solar panel washer comprising a rotating device assembly which rotates the J-shaped main mast and hence the main carrier from rest position to working position, clockwise or counterclockwise to attain its working position above the tops of a row of PV solar panels.

Another aspect of the present invention relates to the auto PV solar panel washer wherein the main carrier is moved up or down by the J-shaped main mast which is joined to the main carrier by a connecting member. The main mast is pushed down or raised up by one or more hydraulic cylinders and connector arrangement for the main carrier to attain the appropriate distance above the tops of a row of PV solar panels.

Another aspect of the present invention relates to the auto PV solar panel washer wherein the positioning hydraulic cylinder pushes one end of the main carrier down or raises it up to attain the desired angle of approximately 15-45 degrees above the tops of a row of PV solar panels.

Another aspect of the present invention relates to the auto PV solar panel washer wherein a control panel performs automatic controls of the connected mechanisms and systems. The control panel is located on the floor of the mobile wheeled device.

Another aspect of the present invention relates to the auto PV solar panel washer wherein various equipment and prime mover devices are placed on the floor of the mobile wheeled device including the J-shaped main mast, rotating device assembly and stationary post, two (2) water tanks with pumps, an electric generator, an air compressor, a hydraulic tank and pump system, and a chemical mixing tank with pumps.

Another aspect of the present invention relates to the auto PV solar panel washer wherein the main carrier is placed in its rest position on brackets in a pan along the bed of the mobile wheeled device for safety and security when travelling over roads and when the auto PV solar panel washer is not in use.

Another aspect of the present invention relates to the auto PV solar panel washer wherein the cleaning wiper system is a mechanical device or assembly whereby the wiper device is comprised of various materials including fabric, rubber, plastic, natural, manmade or a hybrid material, with soft surfaces or otherwise, and whether the material condition is stiff or otherwise. The materials are attached by various means, or the materials are an integral part of the cleaning wiper system.

Another aspect of the present invention relates to the auto PV solar panel washer wherein the cleaning cycle is supplied with clean water including de-ionized (DI) water and additives including bio-degradable materials for detergent and dust repellent action, through wash material pipes with spray devices attached and rinse material pipes with spray devices attached. The cleaning cycle is also supplied with compressed air for drying via piping with air spray devices attached.

Another aspect of the present invention relates to the auto PV solar panel washer system wherein the systems are installed on a mobile wheeled device which is self powered or directly connected to a powered vehicle or powered wheeled device. The operator of the powered wheeled device has a remote control device linked to the control panel for remote control of the equipment and prime mover systems on the mobile wheeled device. The operator also has a vertical position laser guide and annunciator to indicate the position of the main carrier and a visual display to observe the operations as seen from the movie camera mounted at the rear of the mobile wheeled device.

Another aspect of the present invention relates to or comprises of the main carrier which is a rigid frame with fixed mechanisms designed to wash, clean and dry the PV panels automatically.

Another aspect of the present invention relates to a method of protecting PV solar panels comprising a sequence of operations and mechanical actions by the mechanisms on the main carrier while it is a certain distance above and perpendicular to the rows of panels, while approximately parallel to the individual panels in their rows.

Another aspect of the present invention relates to a method of protecting PV solar panels with an automatic (auto) photovoltaic (PV) solar panel washer, comprising the steps of:

spray washing an entire panel surface from wash material pipes with attached spray devices; stopping the spray after a short interval;

activating the cleaning wiper system with each air cylinder working in opposite directions (out-in, out-in) cleaning the panel surfaces;

optionally, spray washing the surface with water and a bio-degradable and dust repellent material while the cleaning wiper system is in action;

stopping the wiper system after a few strokes by each cylinder with each cylinder fully retracted;

spray rinsing the entire panel surface from spray material pipes with attached spray devices; stopping the spray after a short interval;

air drying the panel surface by releasing compressed air from air pipes with air spray attached devices; stopping after a short interval; and applying a bio-degradable dust repellent material as required.

Another aspect of the present invention relates to the cleaning wiper system comprising a mechanical device which holds the cleaning media in place with the wiper system attached at the end of an air cylinder. The cleaning wiper system or cleaning device is used after the PV panels have been spray washed or during the washing cycle to agitate and remove dust, dirt, debris, and other materials from the panel surfaces. In dry applications, for instance removing snow, no water is used.

Another aspect of the present invention relates to the use of air cylinders to cause the cleaning wiper system to clean the surfaces of the panels with the air cylinder pistons or shafts moving in and out thereby moving the cleaning wiper system back and forth along the surfaces of the PV panels.

Another aspect of the present invention relates to the use of the hydraulic cylinders, with one or more hydraulic cylinder and connector arrangement raising and lowering the main mast and hence adjusting the position of the main carrier to achieve a safe distance above the panel surfaces. The positioning hydraulic cylinder determines the angle of the main carrier by pushing one end up or down until the main carrier reaches the desired angle above the panel surfaces for the washing, cleaning, rinsing and drying operations.

Another aspect of the present invention relates to the rotating device assembly comprising a powered motor driving a rotating system which causes the J-shaped main mast, the connecting member and the main carrier to rotate clockwise or counter-clockwise from the rest position. The rotating device is attached to the J-shaped main mast set over the stationary post. The rotation allows the main carrier to move from its rest position in the pan to its working position perpendicular to the bed of the mobile wheeled device.

These and other aspects of the invention will become apparent upon reading the present specification, accompanying drawings and claims.

BRIEF DESCRIPTION OF THE DRAWINGS

Reference is made in detail to a preferred embodiment of the invention, an example of which is illustrated in the accompanying sheets FIG. 1 through FIG. 4.

FIG. 5 is a diagram of the operations sequence of the auto PV solar panel washer.

FIG. 6 is a diagram of the various pipes employed in the auto PV solar panel.

FIG. 7 is a diagram of the spray device employed with the wash water pipes, rinse pipes and compressed air pipes.

FIG. 8A is a diagram of the geared rotating device and stationary post.

FIG. 8B is another view of the main mast and stationary post.

FIG. 9 is a diagram of the programmable controller.

DETAILED DESCRIPTION OF INVENTION

Figure 1:
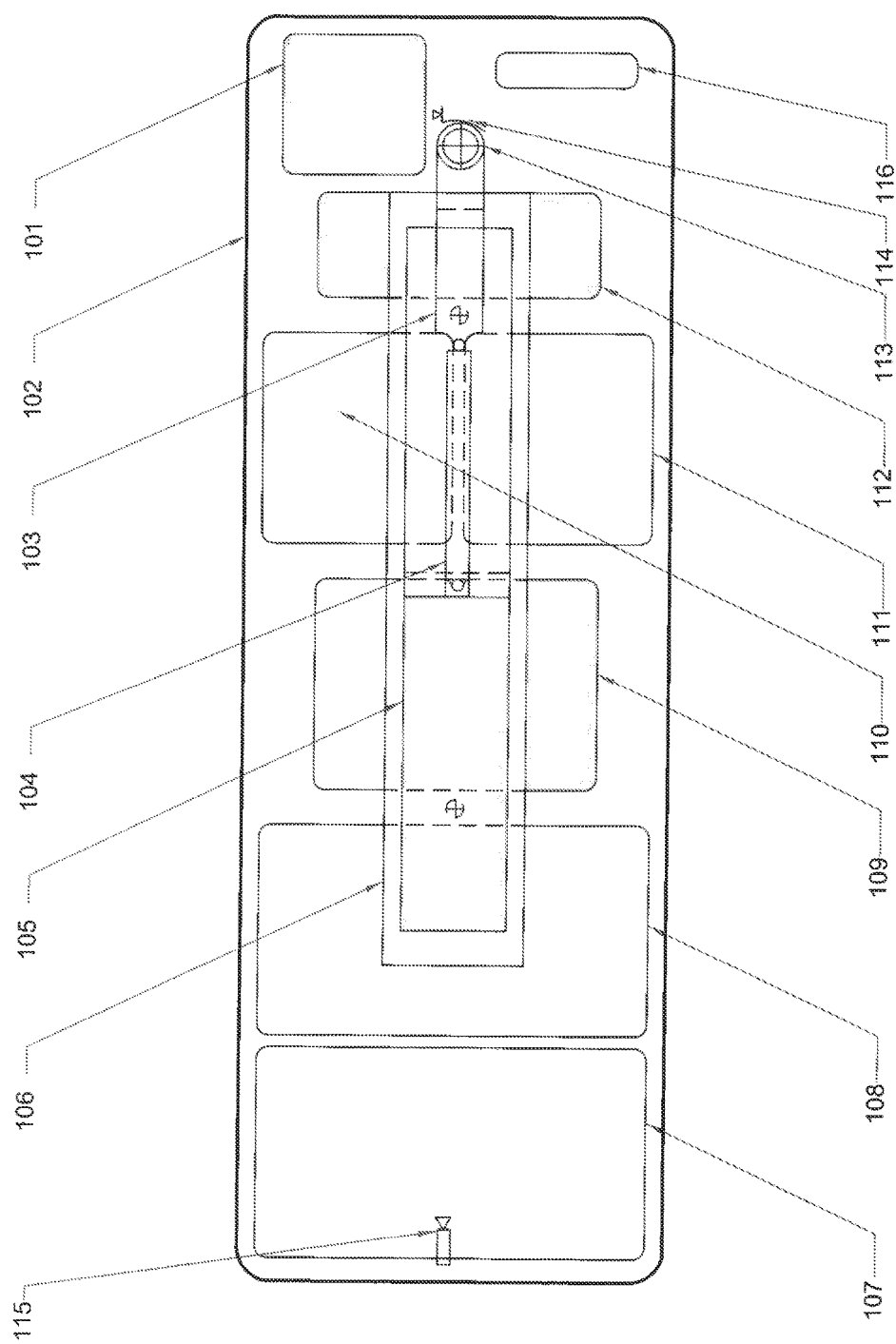
FIG. 1 is a schematic plan view of the auto PV solar panel washer equipment systems on the mobile wheeled device.

In the following description, as used herein, the words "automatic PV solar panels," "auto PV solar panels," "PV panels" or "panels" all refer to one and the same thing and may be used interchangeably. Similarly, the words such as "Deionized water" "DI water" "wash water" "rinse water" or "water" have the same meaning and may be used interchangeably.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

One embodiment of the invention relates to an automatic (auto) photovoltaic (PV) solar panel washer comprising: a main carrier joined by a connecting member to a J-shaped main mast;

a main hydraulic system comprising one or more hydraulic cylinders and connector arrangement on the J-shaped main mast controls the raising and lowering of the main carrier and a positioning hydraulic cylinder controls the angle of the main carrier; a positioning hydraulic cylinder which controls an angle of the main carrier;

a rotating device assembly comprising geared rotating devices which rotates the J-shaped main mast and main carrier about the stationary post, from rest position to working position, clockwise or counterclockwise;

said main carrier comprising a rigid frame with attachments including a cleaning assembly comprising air cylinders with attached cleaning wipers, tracks for the air cylinder shafts, wash material pipes with spray devices, rinse material pipes with spray devices and compressed air drying pipes with air spray devices;

a cleaning wiper system attached to the piston or shaft of a compressed air cylinder, tracks for air cylinder shafts along the length of the main carrier, wash material pipes with spray devices aligned with one air cylinder track; rinse material pipes with spray devices adjacent to one air cylinder, compressed air drying pipes with air spray devices aligned with another air cylinder track; and a prime mover system comprising an air compressor system, a hydraulic pump and tank, a wash water pump and tank, a rinse water pump and tank and an electrical generator, said prime mover system mounted on the floor of the mobile wheeled device.

Another embodiment of the invention relates to the main carrier comprising two (2) air cylinders oriented to move cleaning wiper assemblies attached to the ends of the pistons or shafts back and forth along the faces or active surfaces of the PV solar panels thereby cleaning the panels of dirt, dust, debris, snow or other material.

Another embodiment of the invention relates to the auto PV solar panel washer wherein the wash and rinse material pipes, spray devices and the compressed air pipes and air spray devices provide washing, rinsing and blow drying of the solar panel surfaces during and after the cleaning cycles.

Another embodiment of the invention relates to the auto PV solar panel washer wherein for some materials including snow, only the compressed air pipes would be activated for blow drying after cleaning.

Another embodiment of the invention relates to the auto PV solar panel washer comprising a rotating device assembly rotates the J-shaped main mast and hence, the main carrier from rest position to working position, clockwise or counterclockwise to attain its working position above the tops of a row of PV solar panels.

Another embodiment of the invention relates to the auto PV solar panel washer wherein the main carrier is moved up or down by the J-shaped main mast which is joined to the main carrier by a connecting member. The J-shaped main mast is pushed down or raised up by one or more hydraulic cylinders and connector arrangement for the main carrier to attain the appropriate distance above the tops of a row of PV solar panels.

Another embodiment of the invention relates to the auto PV solar panel washer wherein the positioning hydraulic cylinder pushes one end of the main carrier down or raises it up to attain the desired angle above the tops of a row of PV solar panels.

Another embodiment of the invention relates to the auto PV solar panel washer wherein a control panel performs automatic controls of the connected mechanisms and systems. The control panel is located on the floor of the mobile wheeled device.

Another embodiment of the invention relates to the auto PV solar panel washer wherein various equipment and prime mover devices are placed on the floor of the mobile wheeled device including the J-shaped main mast, rotating device assembly and stationary post, two (2) water tanks with pumps, an electric generator, an air compressor, a hydraulic tank and pump system, and a chemical mixing tank with pumps.

Another embodiment of the invention relates to the auto PV solar panel washer wherein the main carrier is placed in its rest position on brackets in a pan along the bed of the mobile wheeled device for safety and security when travelling over roads and when the auto PV solar panel washer is not in use.

Another embodiment of the invention relates to the auto PV solar panel washer wherein the cleaning wiper system is a mechanical device or assembly. The mechanical device comprises a cleaning media holder with a wiper system attached to the piston or shaft of an air cylinder wherein the cleaning wiper device is comprised of various materials including fabric, rubber, plastic, natural, manmade or hybrid materials, with soft surfaces or otherwise, and whether the material condition is stiff or otherwise. The materials are attached by various means, or the materials are an integral part of the cleaning wiper system. The surface characteristics of the materials will not damage the exposed surfaces of the solar panels when moved along the surfaces in cleaning action, or other materials whether the material condition is flexible with some rigidity to remove snow or heavy dust, sand or soil from the exposed surfaces of a solar panel without causing surface damage when moved along the surfaces in cleaning action. Typical accumulations of dust, sand or soils on the solar PV panel surfaces would be of the order or magnitude of 1 to 5 thousandths of an inch thick, whether continuous or intermittent, about the thickness of a page of paper. Heavy dust, sand, soils, snow or other materials would be of an order of magnitude of 50 thousandths of an inch, whether continuous or intermittent.

Another embodiment of the invention relates to the auto PV solar panel washer wherein the cleaning wiper system materials are attached by various means selected from bolting, clamping, cementing, plastic molding or combinations thereof as one piece or various other means.

Another embodiment of the invention relates to the auto PV solar panel washer wherein the cleaning cycle is supplied with clean water including de-ionized (DI) water and additives including bio-degradable materials for detergent and dust repellent action, through wash material pipes with spray devices attached and rinse material pipes with spray devices attached. The cleaning cycle is also supplied with compressed air for drying via piping with air spray devices attached.

Another embodiment of the invention relates to the auto PV solar panel washer system wherein the systems are installed on a mobile wheeled device which is self powered or directly connected to a powered vehicle or powered wheeled device. The operator of the powered wheeled device has a remote control device linked to the control panel for remote control of the equipment and prime mover systems on the mobile wheeled device. The operator also has a vertical position laser guide and annunciator to indicate the position of the main carrier and a visual display to observe the operations as seen from the movie camera mounted at the rear of the mobile wheeled device.

Another embodiment of the invention relates to prime mover systems comprising equipments of following system or units mounted on the mobile wheeled device. These equipments include air compressor system, hydraulic pump and tank, wash water pump and tank, rinse water pump and tank and electrical generator. There are two water tanks, one of which is a wash water tank and the other a rinse water tank. Each tank comprises one or more internal submersible pumps. The pipes or tubes are connected from the submersible pumps in each tank to the fixed connector nozzles in the walls of the tank. The connector nozzles are in turn connected to pipes on the main carrier. Spray nozzles or water spray devices or air spray devices are attached interchangeably to the pipes or tubes at the main carrier to provide wash water, rinse water or compressed air as required for the washing, rinsing or blow drying of the solar PV panels below the main carrier when in working mode. The programmable controller is programmed to allow certain time intervals for the washing, rinsing and blow drying operations in a certain sequence. The other prime mover devices include an electric generator for electrical power to control the systems and provide motive power for the submersible pumps in the tanks, the air compressor and other electrically controlled or powered equipment, an air compressor to provide compressed air, a hydraulic tank and pump system to provide hydraulic lifting or moving power, a chemical mixing tank to provide washing detergent and chemical mixtures, or combinations thereof.

Another embodiment of the invention relates to or comprises of the main carrier which is a rigid frame with fixed mechanisms designed to wash, clean and dry the PV panels automatically.

Another embodiment of the invention relates to a method of protecting PV solar panels with an automatic photovoltaic solar panel washer comprising a sequence of operations and mechanical actions by the mechanisms on the main carrier while it is a certain distance above and perpendicular to the rows of panels, while approximately parallel to the individual panels in their rows.

Another embodiment of the invention relates to a method of protecting PV solar panels with an automatic photovoltaic solar panel washer, comprising the steps of:

spray washing an entire panel surface from wash material pipes with attached spray devices; stopping the spray after a short interval;

activating a cleaning wiper system with each air cylinder working in opposite directions (out-in, out-in) cleaning the panel surface;

optionally, spray washing the panel surface with water and a bio-degradable and dust repellent material while the cleaning wiper system is in action;

stopping a wiper system after a few strokes by each cylinder with each cylinder fully retracted;

spray rinsing an entire panel surface from spray material pipes with attached spray devices; stopping the spray rinsing after a short interval;

air drying the panel surface by releasing compressed air from air pipes with air spray attached devices; stopping after a short interval; and applying a bio-degradable dust repellent material as required.

Another embodiment of the invention relates to the method of protecting PV solar panels wherein the spray rinsing or air drying is stopped after a short interval of approximately 4-6 seconds.

Another embodiment of the invention relates to the cleaning wiper system comprising a mechanical device which holds the cleaning media in place with the wiper system attached at the end of an air cylinder. The cleaning wiper system is used after the PV panels have been spray washed or during the washing cycle to agitate and remove dust, dirt, debris, and other materials from the panel surfaces. In dry applications, for instance removing snow, no water is used.

Another embodiment of the invention relates to the use of air cylinders to cause the cleaning wiper system to clean the surfaces of the panels with the air cylinder pistons or shafts moving in and out thereby moving the cleaning wiper system back and forth along the surfaces of the PV panels.

Another embodiment of the invention relates to the use of the hydraulic cylinders, with one or more hydraulic cylinders and connector arrangement raising and lowering the J-shaped main mast and hence adjusting the position of the main carrier to achieve a safe distance above the panel surfaces. The positioning hydraulic cylinder determines the angle of the main carrier by pushing one end up or down until the main carrier reaches the desired angle above the panel surfaces for the washing, cleaning, rinsing and drying operations. There is one or more hydraulic cylinders on the main mast and are powered by the hydraulic pump system. The function is to raise or lower the J-shaped main mast to bring it to the position in order to enable the main carrier to be located. There is one or more hydraulic cylinders on the main carrier powered by the hydraulic pump system in order to raise or lower one end of main carrier to locate it over the array of solar panels for washing.

Another embodiment of the invention relates to the rotating device assembly comprising a powered motor driving a rotating system which causes the J-shaped main mast, the connecting member and the main carrier to rotate clockwise or counter-clockwise from the rest position. The rotating device is attached to the J-shaped main mast set over the stationary post. The rotation allows the main carrier to move from its rest position in the pan to its working position perpendicular to the bed of the mobile wheeled device.

Certain exemplary but non-limiting embodiments of the present invention are now described for illustrative purposes only, with reference to the attached drawings.

With reference to FIG. 1, there is illustrated one aspect of the present invention. With reference to FIG. 1, it depicts the arrangement of the equipment systems on the mobile wheeled device (102). The device comprises an equipment pump pad area (101) which includes the floor of the mobile wheeled device (102); the main carrier (105) is joined by connecting member (104) to the J-shaped main mast (103); the pan (106); two (2) main clean water tanks with pumps (107 and 108); an electrical generator (109); an air compressor and tank (110); a hydraulic oil tank and pump system (111); a chemical mixing tank (112); the rotating device assembly (113); a vertical position laser guide and annunciator (114); the electrical control panel (116); and a movie camera (115).

The prime mover systems comprise equipment of the following system or units mounted on the mobile wheeled device. These equipments comprise air compressor system, hydraulic pump and tank (111), wash water pump and tank, rinse water pump and tank and electric generator (109). Various equipment and prime mover devices are placed on the floor of the mobile wheeled device including two (2) water tanks with pumps (107, 108), an electric generator (109), an air compressor and tank system (110), a hydraulic tank and pump system (111) and a chemical mixing tank and pump system (112). An equipment pump pad area (101) is located at one end. A movie camera (115) is fixed at the top area of water tank (107). A vertical position laser guide and annunciator (114) are located on the J-shaped main mast. The annunciator is a signal device comprising a buzzer or alarm to indicate that a set condition has been reached.

The mobile wheeled device (102) is itself powered or attached to a powered vehicle or device to provide mobility in performing its functions. The operator of the powered vehicle or device would have a remote control device linked to the control panel (116) for remote control of the functions described herein, and also a vertical position laser guide and annunciator (114) to gauge the position of the main carrier (105), and a visual display to observe the operations seen from the movie camera (115).

Figure 2:
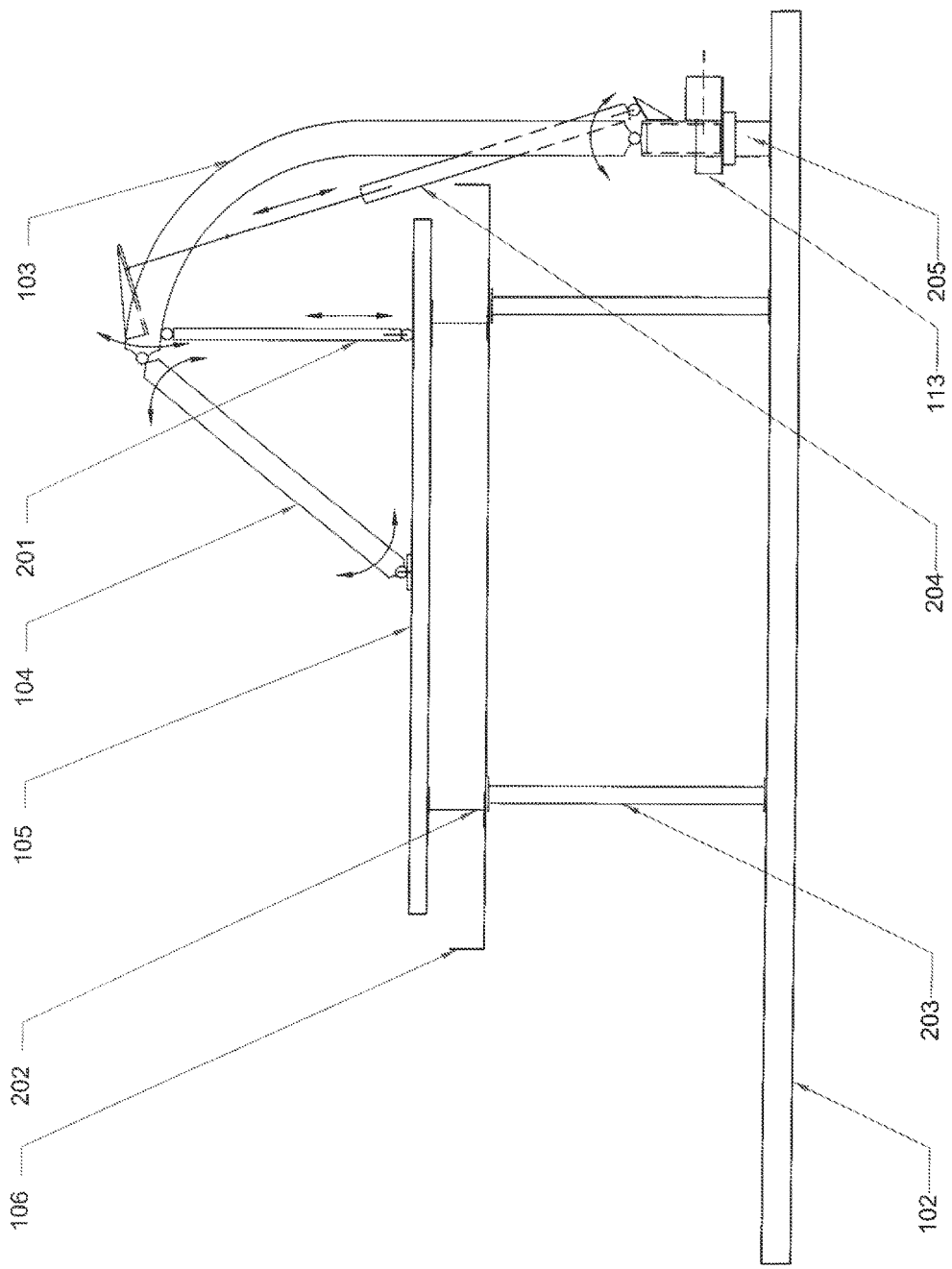
FIG. 2 is a schematic angular view from the side of the auto PV solar panel washer showing the J-shaped main mast and connecting member and the main carrier. The hydraulic cylinders and rotating device assembly are also shown.

Referring to FIG. 2 which depicts an angular view of the system, comprising: the J-shaped main mast (103); the connecting member (104); the positioning hydraulic cylinder (201) determines the angle of the main carrier (105); a support bracket (202) on which the main carrier is placed is in its rest position in the pan; the pan (106) where the main carrier is placed in its rest position on the support brackets; the floor of the mobile wheeled device (102); a support stand (203) which supports the pan; the main hydraulic cylinder (204) on the J-shaped main mast (103) raises the main mast up or pushes it down by at least approximately 12-24 inches, activating the connecting member thereby raising or lowering the main carrier (105); the rotating device assembly (113) rotates the J-shaped main mast (103) and the main carrier (105) clockwise or counterclockwise from the "rest position" over its stationary post (205).

Figure 3:
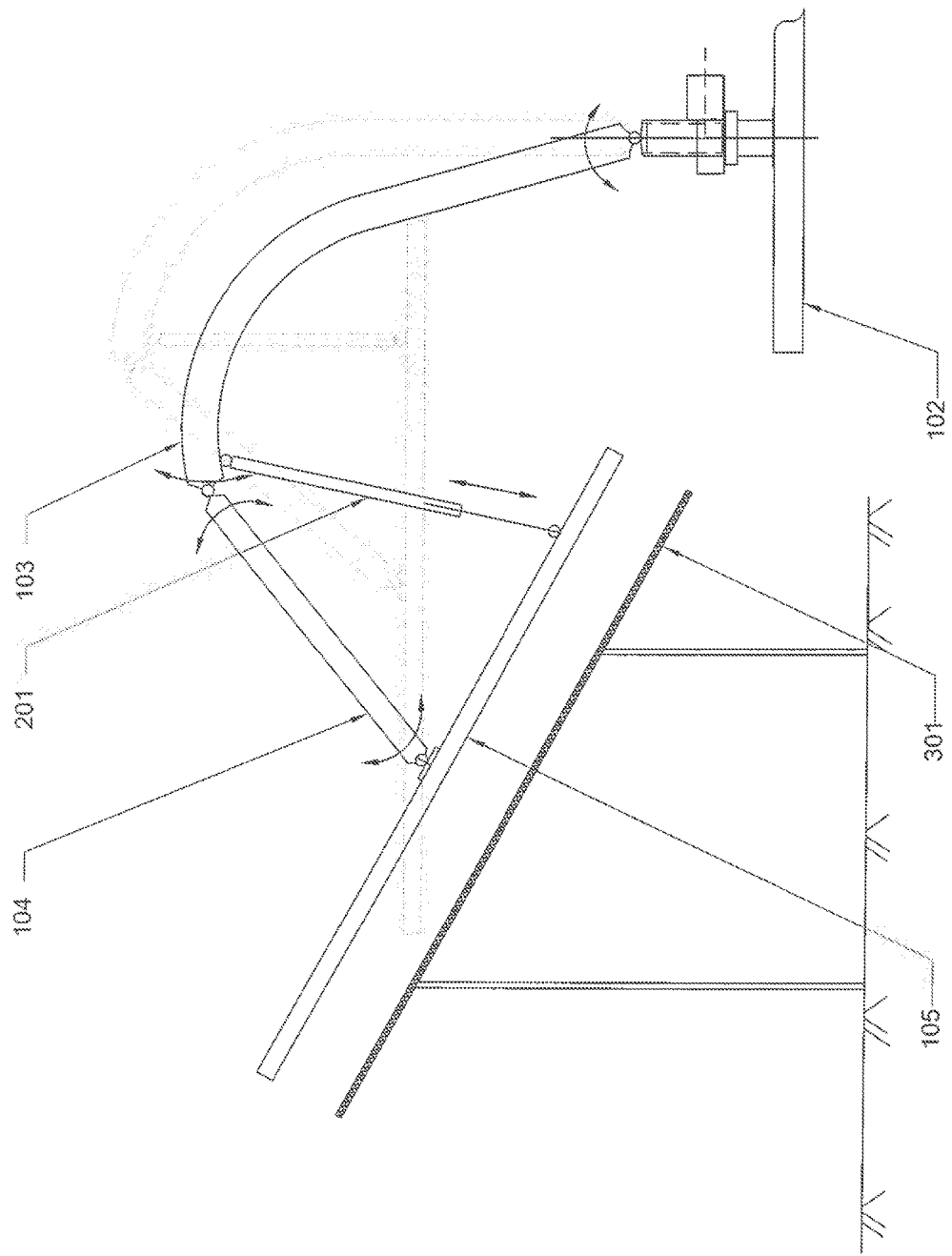
FIG. 3 is a schematic angular view of the J-shaped main mast and main carrier, the connecting member and the positioning hydraulic cylinder. A typical PV solar panel installed in the field is shown with the main carrier some distance above it in a typical operational mode.

Referring to FIG. 3, which depicts an angular view of the assembly, comprising: the J-shaped main mast (103) joined to the main carrier (105) by connecting member (104) and; the positioning hydraulic cylinder (201) determines the angle of the main carrier (105); a PV solar panel is typically installed in the field (301); the floor of the mobile wheeled device (102).

Figure 4:
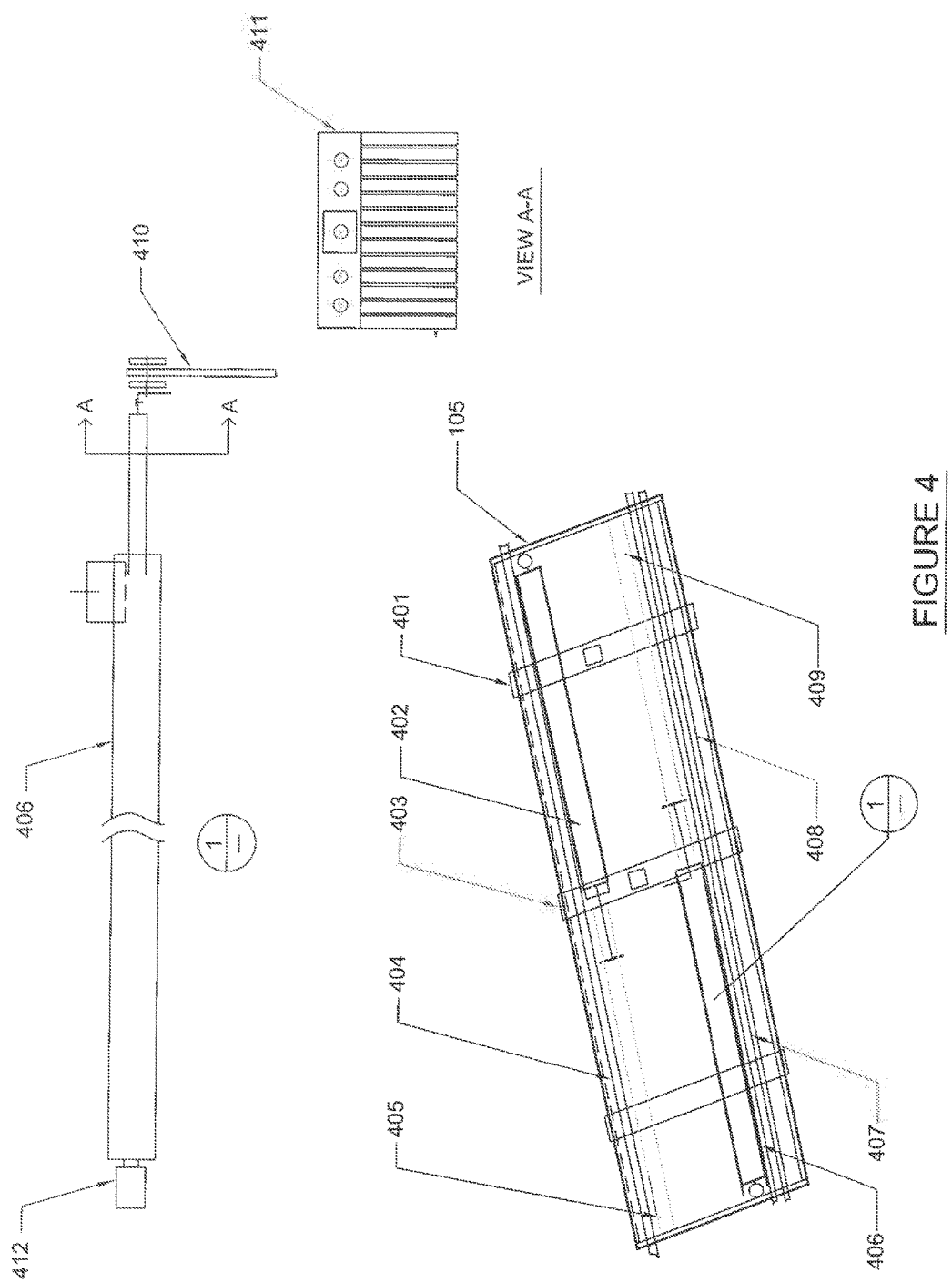
FIG. 4 is a schematic showing details of the main carrier, the air cylinder and cleaning wiper device.

FIG. 4 depicts the main carrier and supporting equipment comprising: a rigid frame of the main carrier (105) with attachments including a cleaning assembly comprising air cylinders (402 and 406) with the attached cleaning wiper systems (410, 411), cylinder tracks (405, 409) for the air cylinder pistons or shafts, wash material pipes with attached spray devices (408), rinse material pipes with attached spray device for rinse material (407) and compressed drying pipes with attached spray devices. The cross member (401) which supports the pipes and air cylinder tracks and provides an attachment at its center for the positioning hydraulic cylinder (204); the cross member (403) which supports the air cylinder and pipes and provides an attachment at its center for the connecting member, the compressed air pipe (404).

The cylinder tracks (405, 409) provide support for the air cylinder pistons or shafts as they move in and out; the connection (412) is at the base of the cylinder to the rigid frame.

The J-shaped main mast (103) and rotating device assembly (113) which comprises geared rotating device is placed over the stationary post (205) located on the floor of a mobile wheeled device (102). The main carrier is placed in its "rest position" on brackets (202) located in a "pan" (106). The pan is supported on stands (203) located on the floor of the mobile wheeled device. The geared rotating device which causes the J-shaped main mast, connecting member and main carrier configured to rotate clockwise or counterclockwise from rest position.

FIG. 5 provides operations sequence comprising washing, cleaning, rinsing and blow drying of the solar PV panels.

FIG. 6 depicts the wash water pipes, rinse water pipes and compressed air pipes. The compressed air pipes are configured to supply air for drying during a cleaning cycle via air spray devices. The water spray devices are attached to wash water pipes and rinse water pipes to provide washing and rinsing. The air spray devices are attached to pipes with compressed air to provide blow drying of the solar panel after cleaning cycle.

FIG. 7 provides the spray devices employed with the wash water pipes, rinse water pipes and compressed air pipes. The materials are pipes and "tees" such as PVC or stainless steel. For interchangeable spray devices, bronze or stainless steel is used. The spray patterns are shown in Table I.

FIG. 8A discloses the geared rotating device and stationary post.

FIG. 8B discloses the partial gear arrangement in the geared rotating device showing the drive shaft, idler gear, transfer idler gear, connecting gear and clutch and J-shaped main mast and gear.

FIG. 9 provides a programmable controller. A control panel (116) performs automatic controls of the mechanisms described herein. The systems are connected to switches in the wash water and rinse water pipes, wherein the water in these pipes is pressurized by pumps in the wash water and rinse water tanks. The control panel systems are also connected to switches in the compressed air pipes, which are pressurized by the air compressor. The operation and control of the connected systems are governed by a programmable controller configured to provide sequencing and time periods for the washing, cleaning and blow drying cycle operations automatically, by opening and closing of the switches in a timed sequence in the compressed air pipes, the wash water pipes and the rinse water pipes thereby allowing the materials in the pressurized pipes to flow out for a set time period through their respective spray devices to perform the washing, rinsing and blow drying operations. The said mobile wheeled device serves as a support base for the PV solar panel washer equipment system.

TABLE I

Spray Patterns employed by the wash water pipes, rinse water pipes and compressed air pipes

| | |
|---|---|
| Straight Cone Spray produced by Spray Device | 1 in 1: 1 inch diameter every inch away from target (6 inches in diameter if target is 6 inches away) |
| | 1 in 2: 2 inches diameter every 1 inch away from target |
| Fan Type produced by Spray device | 1 inch wide "Fan" every 1 inch away from target (6 inches wide "Fan" if target is 6 inches away) |
| | 1 in 2: 2 inches "Fan" every 1 inch away from target |
| Combination Spray produced by Spray Device: Straight Cone and "Fan" | 1 in 1: 1 inch diameter cone and 1 inch "Fan" 1 inch from target |
| | 1 in 2: 2 inches Cone and 2 inches "Fan" every 1 inch away from target |

The inventions described above are, of course, susceptible to many variations, combinations of disclosed components, modifications and changes, all of which are within the skill of the art. It should be understood that all such variations, modifications and changes are within the spirit and scope of these herein described inventions. Similarly, it will be understood that inventor intends to cover and claim all changes, modifications and variations of the examples of the preferred embodiments of the invention herein disclosed for the purpose of illustration which do not constitute departures from the spirit and scope of the present invention as claimed.

Although several preferred embodiments are illustrated and described above, there are possible combinations using other geometries, sensors, materials and different dimensions for the components that perform the same functions. This invention is not limited to the above embodiments and should be determined by the following claims.

The invention claimed is:

1. A method of protecting auto PV solar panel with an automatic (auto) photovoltaic (PV) solar panel washer comprising: a main carrier joined by a connecting member to a J-shaped main mast; a main hydraulic cylinder system comprising one or more hydraulic cylinders and connector arrangement on the J-shaped main mast which controls the raising and lowering of the main carrier, a positioning hydraulic cylinder which controls an angle of the main carrier; a rotating device assembly comprising geared rotating devices which rotate the J-shaped main mast and main carrier about a stationary post, from rest position to working position, clockwise or counterclockwise; a base of the stationary post is bolted to a floor of a mobile wheeled device; said main carrier comprising a rigid frame; said rigid frame comprising attachments including a cleaning assembly comprising one or more air cylinders located on opposite sides in parallel along a length of the main carrier; an air cylinder comprising a piston or compressed air powered device inside a cylindrical body attached to an air cylinder shaft; a cleaning wiper system attached to the piston or shaft of a compressed air cylinder; tracks for air cylinder shafts along the length of the main carrier, wash material pipes with spray devices aligned with one air cylinder track; rinse material pipes with spray devices adjacent to one air cylinder; compressed air drying pipes with air spray devices aligned with another air cylinder track; and a prime mover system comprising an air compressor system, a hydraulic pump and tank, a wash water pump and tank, a rinse water pump and tank and an electrical generator; said prime mover system mounted on the floor of the mobile wheeled device and a control panel comprising electrical systems having circuits, switches, timers and relays;

said method comprising the steps of: a) spray washing an entire solar panel surface from wash material pipes with attached spray devices; b) stopping the spray washing after a short interval; c) activating the cleaning wiper system with each air cylinder working in opposite directions (out-in, out-in) cleaning the panel surfaces; optionally, spray washing the surface with water and a bio-degradable and dust repellent material while the cleaning wiper system is in action; stopping the wiper system after a few strokes by each cylinder with each cylinder fully retracted; d) spray rinsing the entire panel surface from spray material pipes with attached spray devices; stopping the spray rinsing after a short interval of approximately 4-6 seconds; air drying the panel surface by releasing compressed air from air pipes with air spray attached devices; e) stopping after a short interval of approximately 4-6 seconds; and f) applying a bio-degradable dust repellent material as required.

2. An automatic (auto) photovoltaic (PV) solar panel washer comprising: a main carrier joined by a connecting member to a J-shaped main mast; a main hydraulic cylinder system comprising one or more hydraulic cylinders and connector arrangement on the J-shaped main mast which controls the raising and lowering of the main carrier; a positioning hydraulic cylinder which controls an angle of the main carrier; a rotating device assembly comprising geared rotating devices which rotate the J-shaped main mast and main carrier about a stationary post, from rest position to working position, clockwise or counterclockwise; a base of the stationary post is bolted to a floor of a mobile wheeled device; said main carrier comprising a rigid frame; said rigid frame comprising attachments including a cleaning assembly comprising one or more air cylinders located on opposite sides in parallel along a length of the main carrier, an air cylinder comprising a piston or compressed air powered device inside a cylindrical body attached to an air cylinder shaft; a cleaning wiper system attached to the piston or shaft of a compressed air cylinder; tracks for air cylinder shafts along the length of the main carrier; wash material pipes with spray devices aligned with one air cylinder track; rinse material pipes with spray devices adjacent to one air cylinder; compressed air drying pipes with air spray devices aligned with another air cylinder track; and a prime mover system comprising an air compressor system, a hydraulic pump and tank, a wash water pump and tank, a rinse water pump and tank and an electrical generator; said prime mover system mounted on the floor of the mobile wheeled device; and a control panel comprising electrical systems having circuits, switches, timers and relays.

3. The auto PV solar panel washer according to claim 2, wherein the main carrier comprising two air cylinders oriented to move cleaning wiper assemblies attached to the ends of the shafts back and forth along faces or active surfaces of the PV solar panels, thereby cleaning panels of dirt, dust, debris, snow or other material.

4. The auto PV solar panel washer according to claim 2, wherein compressed air causes the piston and shaft of air cylinder to move back and forth along the length of main carrier to provide cleaning action for active surfaces of the PV solar panels.

5. The auto PV solar panel washer according to claim 2, further comprising wash material pipes, rinse material pipes, spray devices, compressed air drying pipes and water spray devices; said pipes with compressed air is configured to supply air for drying via piping with air spray devices; said water spray devices adapted and attached to wash material pipes and rinse material pipes to provide washing and rinsing.

6. The auto PV solar panel washer according to claim 5 wherein the air spray devices are attached to pipes with compressed air to provide blow drying of the solar panel surfaces after cleaning cycles; said compressed air and water spray devices are detachable and interchangeable and said pipes are stationary.

7. The auto PV solar panel washer according to claim 5, further comprising air supply and arranged compressed air pipes configured to be activated for blow drying after a cleaning cycle when devices are selected for removal of snow or ice.

8. The auto PV solar panel washer according to claim 2, wherein the rotating device assembly rotates the J-shaped main mast and configures the main carrier from rest position to working position, clockwise or counterclockwise in order to attain a working position above tops of a plurality of row or arrays of PV solar panels.

9. The auto PV solar panel washer according to claim 2, wherein the J-shaped main mast is pushed down or raised up by a hydraulic cylinder and an arrangement of connector for the main carrier configured on one end to be pushed down or raised by the hydraulic cylinder to attain an appropriate distance above tops of a plurality of rows or arrays of PV solar panels.

10. The auto PV solar panel washer according to claim 2, wherein the control panel is located on the floor of the mobile wheeled device, for performing automatic controls of connected mechanisms and systems; said systems are connected to switches in the wash water and rinse water pipes, wherein the water in these pipes is pressurized by pumps in the wash water and rinse water tanks wherein the control panel systems are also connected to switches in the compressed air pipes which are pressurized by the air compressor.

11. The auto PV solar panel washer according to claim 2, further comprising prime mover devices which are positioned on the floor of a mobile wheeled device; said prime mover devices comprising water tanks, one of which is a wash water tank and another is a rinse water tank; said wash water and rinse water tank having one or more internal submersible pumps connected to pipes or tubes to fixed connector nozzles in the walls of the tank; said connector nozzles are connected to pipes of the main carrier.

12. The auto PV solar panel washer according to claim 11, wherein spray nozzles are attached to pipes or tubes at the main carrier to provide wash water, rinse water or compressed air as required for washing, rinsing or blow drying of the solar PV panels below the main carrier when in working mode.

13. The auto PV solar panel washer according to claim 2, wherein the main carrier is operably placed in its rest position on brackets in a pan along a bed of the mobile wheeled device for safety and security when travelling over roads or when the auto PV solar panel washer is stationary or not in use.

14. The auto PV solar panel washer according to claim 2, wherein the cleaning wiper system further comprises a mechanical device or assembly comprising a cleaning media holder with a wiper system attached to the piston or shaft of a compressed air cylinder, said cleaning wiper comprised of various materials selected from fabric, rubber, plastic, natural, manmade, or a hybrid material.

15. The auto PV solar panel washer according to claim 14 wherein the wiper system is attached to its cleaning media holder by various means or the materials are an integral part of the cleaning wiper system; said various means comprising bolting, clamping, cementing, or plastic molding.

16. The auto PV solar panel washer according to claim 11, wherein the prime mover device comprises a wash water tank with pumps and associated devices with clean water including de-ionized (DI) water and additives including bio-degradable materials for detergent and dust repellent action, through wash material pipes with attached spray devices and a rinse water tank with pumps and associated devices with rinse water and pipes with attached spray devices for cleaning cycle operation.

17. The auto PV solar panel washer according to claim 2, further comprising an air compressor with compressed air configured to supply air under pressure for drying during cleaning cycle operations through piping with attached compressed air spray devices.

18. The auto PV solar panel washer according to claim 2, further comprising a mobile wheeled device where systems are installed; said mobile wheeled device is self powered by a motor or engine configured to provide mobility in performing its function or directly connected to a powered vehicle or powered wheeled device which pulls the mobile wheeled device as a trailer.

19. The auto PV solar panel washer according to claim 18, wherein the powered wheeled device further comprises a remote control device linked to the control panel for remote control of the equipment and prime mover systems on the mobile wheeled device.

20. The auto PV solar panel washer according to claim 2, further comprising a vertical position laser guide and annunciator to indicate the position of the main carrier and a visual display for an operator to observe operations as seen from a movie camera mounted at rear of the mobile wheeled device.

21. The auto PV solar panel washer according to claim 2, wherein a first positioning hydraulic cylinder raises or lowers the main mast by approximately 12 to 24 inches, and another hydraulic cylinder raises or pushes down one end of the main carrier to attain the desired control angle of approximately 15-45°.

* * * * *